US012761383B1

(12) United States Patent
Miesner et al.

(10) Patent No.: US 12,761,383 B1
(45) Date of Patent: Oct. 13, 2026

(54) ACOUSTIC PULSE SOURCE APPARATUS

(71) Applicant: The United States of America, as represented by the Secretary of the Navy, Arlington, VA (US)

(72) Inventors: John E. Miesner, Fairfax, VA (US); Matthew K. Willey, Boyds, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 161 days.

(21) Appl. No.: 18/954,599

(22) Filed: Nov. 21, 2024

(51) Int. Cl.

| | |
|---|---|
| ***G01V 1/137*** | (2006.01) |
| ***G01V 1/133*** | (2006.01) |
| ***G01V 1/38*** | (2006.01) |
| ***G10K 15/04*** | (2006.01) |

(52) U.S. Cl.
CPC .................................... *G01V 1/137* (2013.01)

(58) Field of Classification Search
CPC ........ G01V 1/137; G01V 1/135; G01V 1/133; G01V 1/02; G01V 1/38; G01V 1/145; G10K 1/06; G10K 1/064; G10K 1/068; G10K 15/04; G10K 15/043; G10K 2200/11
See application file for complete search history.

(56) References Cited

U.S. PATENT DOCUMENTS

| | | | | | |
|---|---|---|---|---|---|
| 3,249,177 | A * | 5/1966 | Chelminski | G01V 1/137 | 181/118 |
| 3,277,437 | A * | 10/1966 | Bouyoucos | G01V 1/145 | 116/137 A |
| 3,422,447 | A * | 1/1969 | Kilmer | G01V 1/112 | 181/117 |
| RE26,748 | E * | 12/1969 | Schempf | G01V 1/133 | 181/120 |
| 3,501,741 | A * | 3/1970 | Wallen | G10K 11/205 | 367/172 |
| 3,506,085 | A * | 4/1970 | Loper | G01V 1/137 | 181/118 |

(Continued)

FOREIGN PATENT DOCUMENTS

| | | | | |
|---|---|---|---|---|
| CN | 116559936A A | 8/2023 | | |
| DE | 2937500 C2 * | 9/1988 | G01V 1/135 | |
| GB | 1556899 A * | 11/1979 | G01V 1/135 | |

*Primary Examiner* — Edgardo San Martin
(74) *Attorney, Agent, or Firm* — Jesus J. Hernandez; U.S. Department of the Navy, Office of the General Counsel

(57) ABSTRACT

Example embodiments provide an acoustic pulse source apparatus comprising a pressure cylinder surrounding a pressurized volume, a floating piston slidably mounted in the pressure cylinder, a vented volume with a dividing wall to the pressurized volume, and a bumper attached to the dividing wall, wherein the floating piston is configured to impact the bumper to end a piston stroke by the floating piston. The acoustic pulse source apparatus may further comprise vent valves in the dividing wall, vent valve seats configured to provide a seal surface for the vent valves, an actuator piston connected to the vent valves, a return spring between the actuator piston and the dividing wall, a solenoid air valve in a baseline closed configuration, and a pressure pipe configured to provide high pressure air from the pressurized volume to the solenoid air valve. A floating piston movement may generate acoustic energy.

8 Claims, 4 Drawing Sheets

(56) References Cited

U.S. PATENT DOCUMENTS

| | | | | | |
|---|---|---|---|---|---|
| 3,610,366 | A * | 10/1971 | Goldberg | G01V 1/135 | 116/137 A |
| 3,642,089 | A * | 2/1972 | Parker | G01V 1/135 | 181/120 |
| 3,642,090 | A * | 2/1972 | Bennett | G01V 1/145 | 367/146 |
| 3,670,839 | A * | 6/1972 | Savit | G01V 1/135 | 367/174 |
| 3,741,333 | A * | 6/1973 | Muniz | G01V 1/145 | 367/142 |
| 3,746,123 | A * | 7/1973 | Huffhines | G01V 1/387 | 181/115 |
| 3,919,684 | A * | 11/1975 | Reed | G01V 1/133 | 367/145 |
| 4,139,835 | A * | 2/1979 | Cholet | G01V 1/135 | 181/120 |
| 4,203,501 | A * | 5/1980 | Cholet | G01V 1/145 | 251/63.4 |
| 4,811,815 | A * | 3/1989 | Meier | G01V 1/133 | 181/402 |
| 5,894,451 | A * | 4/1999 | DeJaco | G01V 1/135 | 367/174 |
| 5,973,999 | A * | 10/1999 | Naff | G10K 15/04 | 181/142 |
| 6,217,635 | B1 * | 4/2001 | Conrad | B01D 53/053 | 96/144 |
| 6,286,612 | B1 * | 9/2001 | Pascouet | G01V 1/137 | 181/111 |
| 7,878,263 | B2 | 2/2011 | Keskiniva | | |
| 8,102,731 | B2 | 1/2012 | Cambois | | |
| 8,353,383 | B2 | 1/2013 | Carson | | |
| 8,387,744 | B2 | 3/2013 | Harper | | |
| 8,441,892 | B2 | 5/2013 | Morozov | | |
| 8,634,276 | B2 | 1/2014 | Morozov | | |
| 9,581,704 | B2 | 2/2017 | Fullerton | | |
| 10,031,245 | B2 * | 7/2018 | Chelminski | G01V 1/137 | |
| 10,036,822 | B2 | 7/2018 | Sautron | | |
| 11,726,222 | B2 | 8/2023 | Greffet | | |
| 2023/0010643 | A1 * | 1/2023 | Rüegg | F04B 19/04 | |

* cited by examiner

ACOUSTIC PULSE SOURCE APPARATUS

STATEMENT OF GOVERNMENT INTEREST

The following description was made in the performance of official duties by employees of the Department of the Navy. The claimed subject matter, encompassing various example embodiments, may be manufactured, used, licensed by or for the United States Government for governmental purposes without the payment of any royalties thereon. Potential licensees may contact the Technology Transfer Office, NAVSEA Naval Surface Warfare Center, Carderock Division, 9500 MacArthur Ave., West Bethesda, MD 20817, USA.

FIELD

The following description relates generally to a high-energy directional underwater acoustic pulse source that is controllable in both pulse duration and magnitude.

BACKGROUND

Underwater acoustic pulse sources may be in various configuration types. For example, one type of underwater acoustic pulse source may include a piston in contact with water on the piston face with the piston slidably mounted in a cylinder and sealed around the periphery. When the piston is rapidly withdrawn into the cylinder, the water may follow until the piston reaches the end of its stroke when it stops. This may result in the kinetic energy of fluid motion being converted to fluid pressure, which may propagate as an acoustic wave pulse. A drawback of such acoustic pulse sources may be that their use case may be limited to a relatively shallow depth and low acoustic energy.

SUMMARY

Example embodiments provide an acoustic pulse source apparatus comprising a pressure cylinder surrounding a pressurized volume, a floating piston slidably mounted in the pressure cylinder, a vented volume with a dividing wall to the pressurized volume, and a bumper attached to the dividing wall, wherein the floating piston is configured to impact the bumper to end a piston stroke by the floating piston. The acoustic pulse source apparatus may further comprise vent valves in the dividing wall, vent valve seats configured to provide a seal surface for the vent valves, an actuator piston connected to the vent valves, a return spring between the actuator piston and the dividing wall, a solenoid air valve in a baseline closed configuration, and a pressure pipe configured to provide high pressure air from the pressurized volume to the solenoid air valve. A floating piston movement may generate acoustic energy.

Other features and advantages of the example embodiments will become apparent to those skilled in the art upon examination of the following or upon learning by practice of the example embodiments.

BRIEF DESCRIPTION OF DRAWINGS

The accompanying figures are included to provide a further understanding of example embodiments, and are incorporated in and constitute part of this specification. In the figures.

DETAILED DESCRIPTION

Figure 1A:
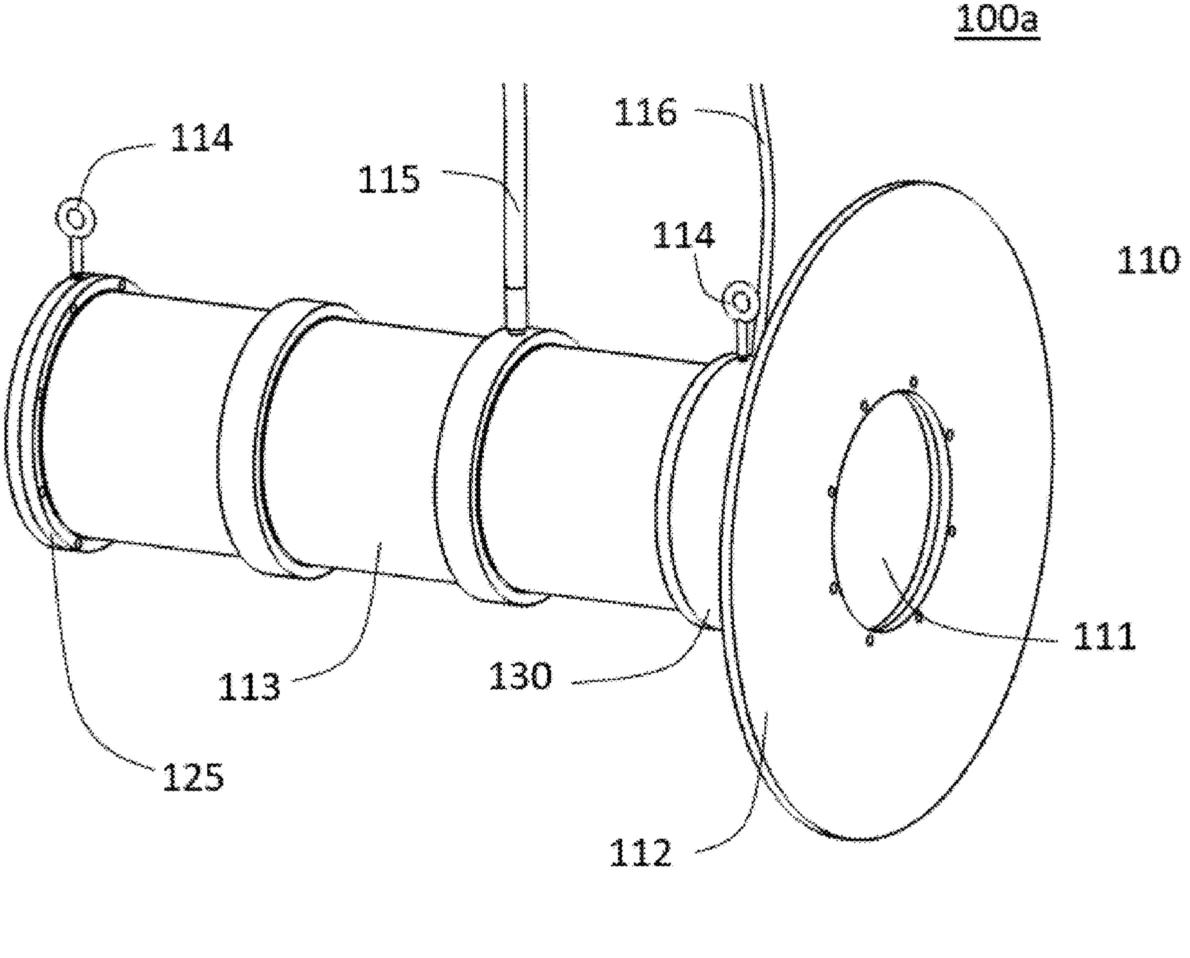
FIG. 1A is an illustration of an acoustic pulse source, according to example embodiments.

In the following description, for purposes of explanation and not limitation, specific details are set forth such as particular structures, designs, techniques, etc., in order to provide a thorough understanding of the example embodiments. However, it will be apparent to those skilled in the art that the disclosed subject matter may be practiced in other illustrative embodiments that depart from these specific details. In some instances, detailed descriptions of well-known elements and/or method are omitted so as not to obscure the description with unnecessary detail. All principles, aspects, and embodiments, as well as specific examples thereof, are intended to encompass both structural and functional equivalents of the disclosed subject matter. Additionally, it is intended that such equivalents include both currently known equivalents as well as equivalents developed in the future.

The following description refers to an acoustic pulse source apparatus. However, it should be noted that the example embodiments shown and described herein are meant to be illustrative only and not limiting in any way. As such, various modifications will be apparent to those skilled in the art for application of example embodiments based on technologies other than the above, which may be in various stages of development and intended for future replacement of, or use with, the above described method or apparatus.

The goal of example embodiments is to provide a high-energy directional underwater acoustic pulse source that is controllable in both pulse duration and magnitude, and which can effectively operate at depth of at least 500 meters.

Conventional underwater acoustic pulses may include two pistons in two cylinders. The pistons may be connected by a push rod passing through the wall between the cylinders. The larger piston may be in contact with surrounding water. The smaller piston may capture air on one side. A pipe may be connected to an air pressure source and vent valve on the other side. Air pressure from the source may be used to push both pistons forward into the "cocked position" against the spring force exerted by the captured air. Venting the air from one side of the small piston may result in the air spring on the other side pushing both pistons backward—with the water following. If the motion is rapid enough to create a cavity, then a pressure pulse may occur when the cavity collapses. If a cavity is not created, then the pressure pulse may occur when the pistons stop.

The acoustic pulse source of conventional underwater acoustic pulses may be limited to relatively shallow depth and low acoustic energy. First, as depth increases, the density of the air which must be vented to obtain piston motion, may also increase. This air may be vented through the outlet pipe and control valve. The increased mass flow rate may result in sonic velocity and choked flow through the vent, limiting the rate of depressurization and therefore the rate of piston motion and the energy of the acoustic pulse. Second, for high acoustic energy, the amount of fluid moving and its velocity may be correspondingly high. This fluid motion may result in an "added" or "virtual" mass, which is effectively added to the piston mass increasing the inertia. This inertia may further reduce the piston velocity for a given force and may result in the body of the apparatus moving toward the piston face, reducing the usable piston stroke.

Conventional approaches do not overcome either of these limitations and are therefore unable to produce high acoustic energy at significant depth. Accordingly, a need exists in the art for a high-energy directional underwater acoustic pulse source that is controllable in both pulse duration and magnitude and which can effectively operate at depth of at least 500 meters.

Example embodiments provide a high-energy directional underwater acoustic pulse source that is controllable in both pulse duration and magnitude and which can effectively operate at depth of at least 500 meters. The acoustic pulse source may be submerged in water suspended from a surface platform that supplies high pressure air, venting, power, and control. The acoustic pulse source may include a floating piston slidably mounted in a pressure cylinder. Movement of the floating piston may result in corresponding motion of the contacting water. This may lead to a change in pressure. An O-ring may provide a seal between the floating piston and the pressure cylinder while low friction rings may ensure smooth axial motion of the floating piston within the pressure cylinder without a piston rod.

The acoustic pulse source may also include a vented volume with a dividing wall to the pressurized volume. The dividing wall may include vent valves such that opening the valves may allow air to flow from the pressurized volume to the vented volume. The vent valves may be connected to an actuator piston by valve stems supported by low friction bearings. A return spring may be between the actuator piston and the dividing wall may keep the vent valves in the closed position against the valve seats. A pressure pipe may provide high-pressure air from the pressurized volume to a normally closed solenoid air valve. When the solenoid air valve is electrically opened, high-pressure air from the pressurized volume may cause the actuator piston to rapidly move forward compressing the return spring and lifting the vent valves off their seats allowing air to flow from the pressurized volume to the vented volume.

A baffle with water on both sides may prevent the floating piston from moving out of pressure cylinder in the forward direction and a bumper provides a compliant impact surface for the floating piston when it reaches the end of stroke at the dividing wall.

To generate an acoustic pulse, the pressurized volume may be first pressurized to above the ambient water pressure. This may cause the floating piston to slide forward into contact with the baffle. Pressure in the vented volume may then be adjusted as desired. The solenoid air valve may be opened. Opening of the solenoid air valve may open the vent valves venting the pressurized volume into the vented volume. The floating piston may accelerate down the length of pressure cylinder. Water in contact with the floating piston may also accelerate gaining velocity. When the floating piston reaches the bumper, it may rapidly come to a stop and the water in contact may stop. The abrupt stopping of the water may cause a pressure pulse similar to the familiar water hammer effect. The pressure pulse may propagate as acoustic energy to the far field. The solenoid air valve may be then electrically closed and the pressurized volume may be again pressurized, returning the floating piston to the forward position against the baffle and the acoustic pulse source is ready for the next cycle.

The energy in a pulse may be controlled by setting the pressure in the vented volume prior to a pulse. The pulse duration may depend on the time that floating piston takes to stop at the end of stroke, which is controlled by the bumper stiffness. The bumper may be designed to obtain a pressure pulse with a required spectral frequency content.

The baffle may provide a large “added” or “virtual” mass to the body of acoustic pulse source preventing it from moving appreciably when the piston with its added mass is accelerated. The baffle may also increase the directionality of the acoustic pulse source by reflecting a portion of the acoustic energy toward the front providing increased acoustic energy in that direction.

In a second embodiment, an air compressor may reside in the vented volume and may provide pressurized air from the vented volume to the pressurized volume removing the need for a pressure hose from the platform.

FIG. 1A is an illustration 100*a* of an acoustic pulse source, according to example embodiments. An acoustic pulse source 110 may comprise a floating piston 111, a baffle 112, a shell 113, eyebolts 114, a vent hose 115, a pressure hose 116, a pressure cylinder 130, and an end closure 125.

During operation, the acoustic pulse source 110 may be submerged in water and suspended from a surface platform by cables (not shown). The cables may be attached to the eyebolts 114. The pressure hose 116 and the vent hose 115 may be suspended from the surface platform as well. The surface platform may provide support and control functions, such as pressurized air and electrical power. The shell 113 may be watertight and sealed on the back end by the end closure 125 and on the front end by the pressure cylinder 130. The floating piston 111 may be slidably mounted in the pressure cylinder 130 with a watertight seal to the pressure cylinder 130. Movement of the floating piston 111 may result in corresponding motion of the contacting water and therefore pressure changes.

The floating piston 111 may be made of strong and lightweight material such as titanium or carbon fiber to reduce the mass and inertia. The baffle 112 may be attached to the pressure cylinder 130 and may be in contact with water on both the front and back sides.

Figure 1B:
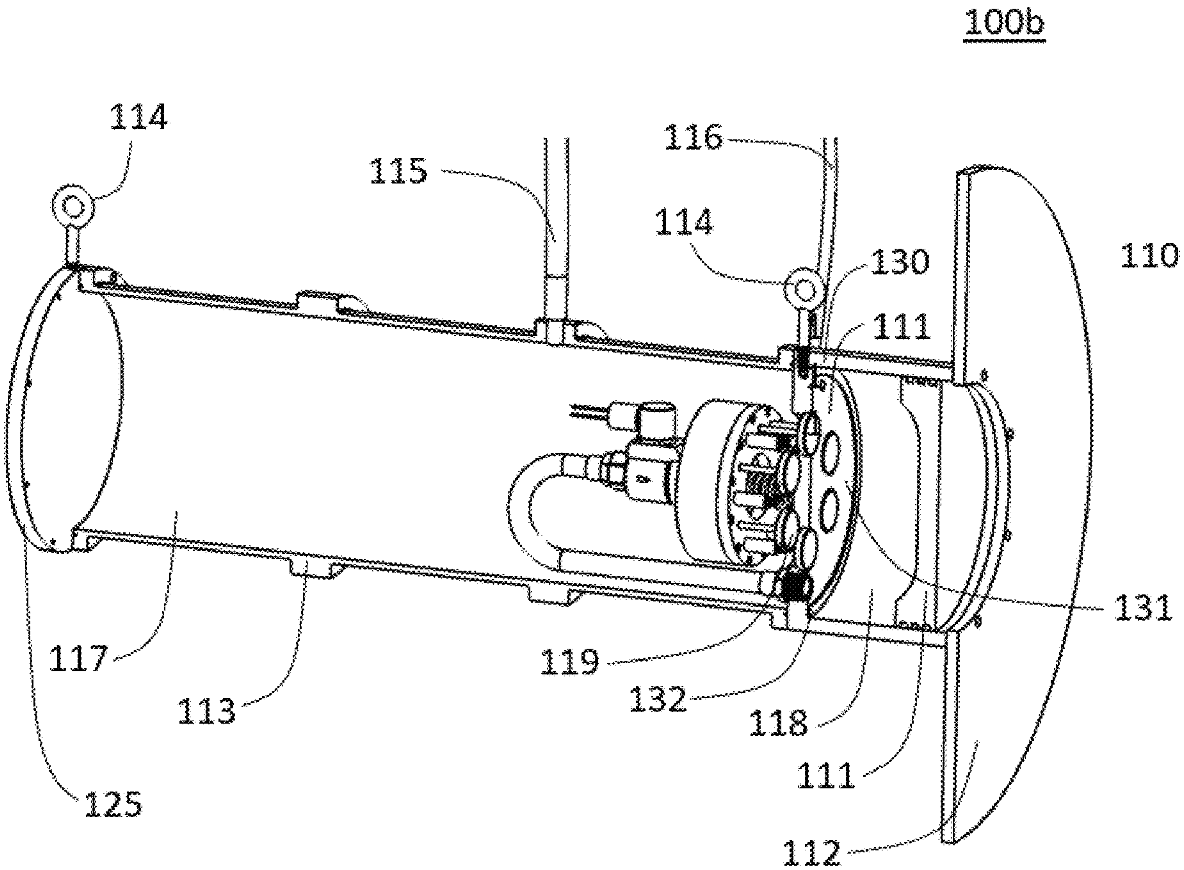
FIG. 1B is a cutaway illustration of an acoustic pulse source, according to example embodiments.

FIG. 1B is a cutaway illustration 100*b* of an acoustic pulse source, according to example embodiments. This cutaway illustration 100*b* depicts additional components of the acoustic pulse source 110. From this perspective, the acoustic pulse source 110 may comprise a floating piston 111, a baffle 112, a shell 113, eyebolts 114, a vent hose 115, a pressure hose 116, a vented volume 117, a pressurized volume 118, vent valves 119, a pressure cylinder 130, a dividing wall 131, a bumper 132, and an end closure 125.

From the perspective of cutaway illustration 100*b*, the pressure cylinder 130 may surround the pressurized volume 118 between the dividing wall 131 and the floating piston 111. The pressure hose 116 may be connected to the pressurized volume 118. The shell 113 may surround the vented volume 117 between the end closure 125 and the dividing wall 131. The vented volume 117 may be connected to the vent hose 115. The vent valves 119 may be in dividing wall 131, such that opening the vent valves 119 may allow air to flow from the pressurized volume 118 to the vented volume 117.

Figure 2:
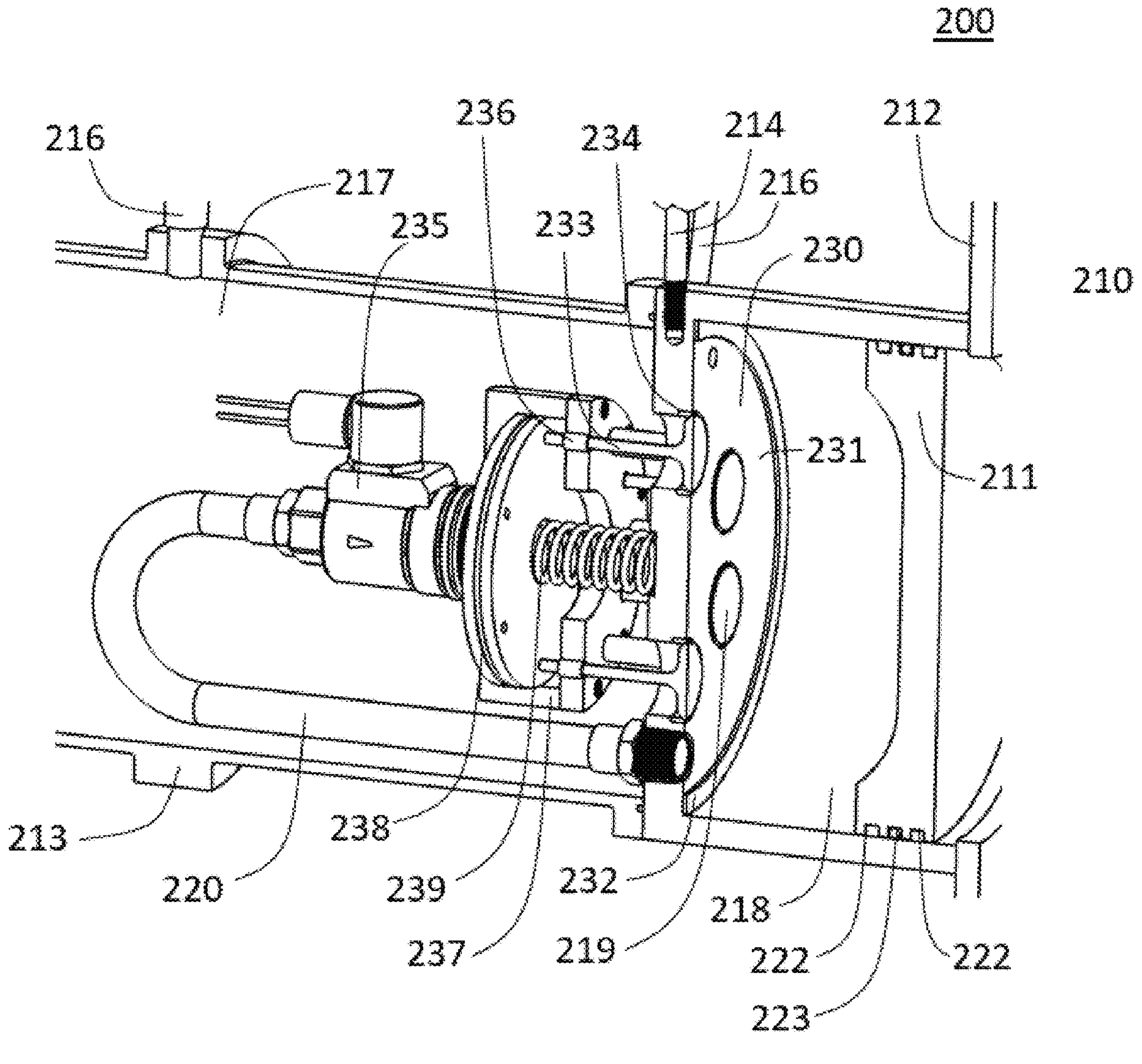
FIG. 2 is a cutaway illustration of a detailed portion of an acoustic pulse source, according to example embodiments.

FIG. 2 is a cutaway illustration 200 of a detailed portion of an acoustic pulse source, according to example embodiments. The detailed portion of an acoustic pulse source 210 may comprise a floating piston 211, a baffle 212, a shell 213, eyebolts 214, a pressure hose 216, a vented volume 217, a pressurized volume 218, vent valves 219, a pressure pile 220, low friction rings 222, and an O-ring 223. The acoustic pulse source 210 may also comprise a pressure cylinder 230, a dividing wall 231, a bumper 232, valve stems 233, vent valve seats 234, a solenoid air valve 235, low friction bearings 236, an actuator cylinder 237, a vent valve actuator piston 238, and a return spring 239.

The vent valve actuator piston 238 may be slidably mounted to the actuator cylinder 237. The vent valves 219 may be connected to the actuator piston 238 by valve stems 233. The valve stems 233 may be supported by the low friction bearings 236. The return spring 239 may be between the actuator piston 238 and the dividing wall 231. The return spring 239 may provide a force to keep the vent valves 219 in the closed position against the vent valve seats 234. The pressure pipe 220 may provide high-pressure air from the pressurized volume 218 to normally closed solenoid air valve 235.

The cutaway illustration 200 also shows that the O-ring 223 may provide a seal between the floating piston 211 and the pressure cylinder 230 while allowing the floating piston 211 to move axially. The low friction rings 222 may ensure smooth axial motion of the floating piston 211 within pressure cylinder 230 without a piston rod. The baffle 212 may prevent the floating piston 211 from moving out of the pressure cylinder 130 in the forward direction and the bumper 232 may provide a compliant impact surface for the floating piston 211 when it reaches the end of stroke at the dividing wall 231.

Based on the cutaway illustration 200, a complete cycle of operation of the acoustic pulse source 210 is as follows. The pressurized volume 218 may be first pressurized to above the ambient water pressure through the pressure hose 216. This may cause the floating piston 211 to slide forward into contact with the baffle 212. The pressure in the vented volume 217 may be adjusted as desired through the vent hose 215. The solenoid air valve 235 may be then electrically opened. This operation may allow high-pressure air from the pressurized volume 218 to pass through the pressure pipe 220 to the bottom of the actuator piston 238. The passing high pressure air may cause the actuator piston 238 to rapidly move forward, compressing the return spring 239 and lifting the vent valves 219 off the vent valve seats 234. This may allow air to flow from the pressurized volume 218 to the vented volume 217.

The floating piston 211 may start to move when the ambient water pressure is higher than the pressure in the pressurized volume 218. The floating piston 211 may accelerate as it moves down the length of the pressure cylinder 230. The water in contact with the floating piston 211 may also accelerate, gaining velocity. When the floating piston 211 reaches the bumper 232, it may rapidly come to a stop and the water in contact may stop as well. The abrupt stopping of the water may cause a pressure pulse similar to a water hammer effect. The pressure pulse may propagate as acoustic energy to the far field. The solenoid air valve 235 may be then electrically closed and volume 218 may be pressurized, returning the floating piston 211 to the forward position against the baffle 212. At this point, the acoustic pulse source 210 may be ready for the next cycle.

The acceleration of floating piston 211 may be proportional to a mass of the piston, which should be as low as practical, plus a "virtual" or "added" mass of the water. The added mass for one side of a flat plate may be estimated as follows:

$$M_w = \frac{8}{3}\rho R^3$$

Where $M_w$ is the added mass (kg), p is the fluid density (kg/m^-3), and R is the plate radius (m). The added mass may be substantial. For example, a one-sided flat plate of 0.3 m radius may have an added mass of approximately 9 kg in water. It should also be noted that water may enter the portion of the pressure cylinder that is vacated by the inward motion of the floating piston 211. The mass of this entering water may be accelerated along with the floating piston 211. For an acoustic pulse source using piston motion, the force applied to accelerate the floating piston 211 and water may result in an equal and opposite force on the rest of the apparatus. Thus, as the floating piston 211 and contacting water accelerate inward, the rest of the apparatus may accelerate in the opposite direction toward the piston. The piston stroke and resulting velocity therefore may be substantially reduced.

In the example embodiments, the baffle 212 may provide a relatively large added mass to the acoustic pulse source 210. As a result, there may be correspondingly little motion toward the piston, allowing acceleration for substantially the entire piston stroke with increased velocity and acoustic energy compared to conventional approaches. The baffle 212 may also increase the directionality of the acoustic pulse source 210 by reflecting a portion of the acoustic energy toward the front, resulting in increased acoustic energy in that direction.

The energy in the acoustic pulse may be calculated from the kinetic energy of the water at the time the floating piston 211, and therefore the water in contact, is stopped at the end of the piston stroke when it contacts bumper 232. The kinetic energy of the water may be calculated as follows:

$$E_w = \frac{1}{2} M_w v^2$$

Where $M_w$ is the added mass (kg) of the water plus the mass of the water that enters the pressure cylinder, $E_w$ is the kinetic energy (J) of the water, and v is the velocity (m/s) of floating piston 211. The velocity of piston 211 may be maximized by maintaining acceleration as high as possible over the entire stroke. The floating piston 211 acceleration may be proportional to the difference in pressure between the ambient water and the pressure in pressurized volume 218. Maximum differential pressure may require transferring air from the pressurized volume 218 into vented volume 217 as quickly as possible.

As depth increases, the pressure and density of the air in pressurized volume 218 may also increase. The increased mass flow rate may result in sonic velocity and choked flow, limiting the rate of depressurization and therefore the piston velocity and the energy of the acoustic pulse. Conventional approaches are extremely limited at depth because the air must be vented through an outlet pipe and control valve. In contrast, example embodiments provide vent valves 219 that may transfer air directly from the pressurized volume 218 to vented volume 217. The vent valves may be poppet valves. The poppet valve may be designed to reach full flow with very little motion and have a large flow cross-sectional area. The actuator piston 238 may be designed to move the vent valves rapidly to the full flow position. The air mass flow rate for example embodiments may be 20 to 100 times higher than conventional approaches, resulting in correspondingly higher piston velocity and water kinetic energy.

Water kinetic energy may determine the acoustic energy in the pulse but the pulse duration may depend on the time that floating piston 211 takes to stop at the end of stroke. In example embodiments, the bumper 232 may control the stopping distance and its thickness, radial dimensions, material stiffness, and overall shape allow control over the pressure pulse shape. The design bumper 232 may be designed to obtain a pressure pulse with a required spectral frequency content.

The peak pressure of the pulse may be approximated by noting that stopping force is equal to both mass times acceleration and to pressure times area as follows:

$$F = M_w a = PA \rightarrow P = \frac{M_w a}{A}$$

Where $M_w$ is the added mass (kg) of the water plus the mass of the water that enters the pressure cylinder, a is the deceleration (m/sec^2) of the water, P is pressure (Pa), and A is the area (m^2) of floating piston 101.

As an example, consider the bumper 232 may have a thickness of 0.01 m and a stiffness of 10 MN/m installed in the acoustic pulse source 210. The floating piston 211 may have a radius 0.15 m and stroke of 0.12 m at a depth of 300 m, where the pressure is 3.0 GPa. There may be six (6) of the vent valves 219 with a radius of 25 mm. The effective total flow cross-section may be 8000 mm^2 and the floating piston 211 may experience a peak acceleration of 1.0 km/s^2 and have a velocity of 14 m/sec at the end of stroke. The added water mass may be 9 kg and the mass of water in the pressure cylinder 230 may be 8.5 kg at the end of stroke for an effective mass of 17.5 kg of moving water at the end of stroke. Upon contact with the bumper 232, the deceleration may reach a peak of 100 km/s^2 and stopping time may be 0.16 msec, which may cause a pressure pulse of approximately the same duration. The pressure pulse peak may be approximated by the mass of water (17.5 kg) times the deceleration (100 km/s^2) divided by the piston area (0.07 m) or 25 MPa. A more precise calculation including flexing of the piston face may lower the pressure peak to approximately 20 MPa for a typical piston made of titanium. For this same example, but with the bumper 232 having a thickness of 0.02 m and a stiffness of 5 MN/m, the pulse duration may be approximately twice as long with half the peak pressure and with spectral content compressed to half the frequency. Note that the pressure in the vented volume 217 at pulse initiation may be set higher than atmospheric to reduce the pressure peak as desired.

Figure 3:
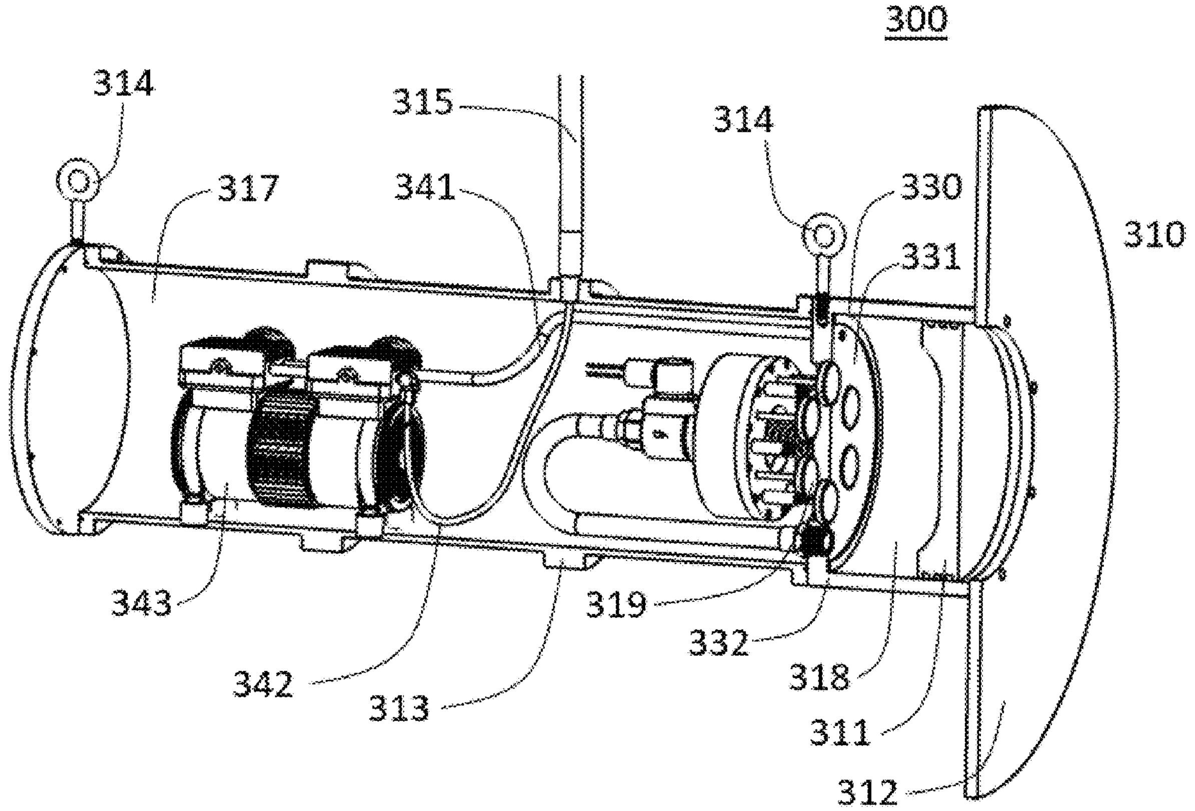
FIG. 3 is a cutaway view illustration of an alternative acoustic pulse source, according to example embodiments.

FIG. 3 is a cutaway view illustration 300 of an alternative acoustic pulse source, according to example embodiments. The alternative acoustic pulse source 310 may comprise a floating piston 311, a baffle 311, a shell 313, eyebolts 314, a vent hose 315, a vented volume 317, a pressurized volume 318, vent valves 319, a pressure cylinder 330, a dividing wall 331, an a bumper 331. The alternative acoustic pulse source 310 may also comprise a pipe 341, a power cord 342, and an air compressor 343.

In this example embodiment, the air compressor 201 may reside in the vented volume 317 and may provide pressurized air to the pressurized volume 318 through the pipe 341. Electrical power may be provided to the air compressor 343 through the power cord 242 from a surface support platform (not shown). In some example embodiments, the platform may not provide a pressure hose. All descriptions provided for previous embodiments may also apply to the alternative acoustic pulse source 310, except that pressurized air may be provided by the air compressor 343 rather than a support platform.

The example embodiments being thus described, it will be obvious that the same may be varied in many ways. Such variations are not to be regarded as a departure from the disclosed subject matter, and all such modifications are intended to be included within the scope of the disclosed subject matter.

What is claimed is:

1. An acoustic pulse source apparatus comprising:

a pressure cylinder surrounding a pressurized volume;

a floating piston slidably mounted in the pressure cylinder;

a vented volume with a dividing wall to the pressurized volume;

a bumper attached to the dividing wall, wherein the floating piston is configured to impact the bumper to end a piston stroke by the floating piston;

vent valves in the dividing wall such that opening the valves allows air to flow from the pressurized volume to the vented volume;

vent valve seats configured to provide a seal surface for the vent valves;

an actuator piston connected to the vent valves;

a return spring between the actuator piston and the dividing wall, the return spring configured to maintain the vent valves in a baseline closed position against the vent valve seats;

a solenoid air valve in a baseline closed configuration;

a pressure pipe configured to provide high-pressure air from the pressurized volume to the solenoid air valve, wherein a floating piston movement is based on a manipulation of the pressurized volume, wherein the floating piston movement generates acoustic energy.

2. The acoustic pulse source apparatus of claim 1, wherein the manipulation of the pressurized volume comprises an interaction of the solenoid air valve, the vent valves, the vented volume, and the floating piston, wherein the solenoid air valve in the baseline closed configuration is configured to be electrically opened to provide high-pressure air under the actuator piston, causing the actuator piston to move forward, wherein the vent valves are configured to open in response to the movement of the actuator piston, wherein the vented volume is configured to receive vented air from the pressurized volume when the vent valves are opened, wherein the floating piston is configured to move when venting the pressurized volume causes the pressure within the pressurized volume to be less than ambient water pressure.

3. The acoustic pulse source apparatus of claim 2, wherein the floating piston movement generating acoustic energy comprises an interaction of the floating piston, the pressure cylinder, and the bumper, wherein the floating piston is configured to accelerate down the length of the pressure cylinder and gain velocity, wherein the floating piston is configured to cause water in contact with the floating piston to accelerate and gain velocity, wherein the floating piston is configured to come to an abrupt stop when the floating piston impacts the bumper, the abrupt stop of the floating piston causing the water in contact to cause a pressure pulse that propagates as acoustic energy to the far field.

4. The acoustic pulse source apparatus of claim 3, wherein the acoustic energy in the pressure pulse is controlled by setting a pressure in the vented volume prior to a pressure pulse.

5. The acoustic pulse source apparatus of claim 3, wherein pulse duration and pressure magnitude are adjusted by varying at least one of thickness, radial dimensions, material stiffness, and overall shape of the bumper in order to obtain a desired spectral frequency content.

6. The acoustic pulse source apparatus of claim 3, wherein the baffle provides a large virtual mass to the body of the acoustic pulse source apparatus, preventing the acoustic pulse source apparatus from moving appreciably when the floating piston, with its added mass, is accelerated.

7. The acoustic pulse source apparatus of claim 3, wherein the baffle increases the directionality of the acoustic pulse source apparatus by reflecting a portion of the acoustic energy toward a front end of the acoustic pulse source apparatus, resulting in increased acoustic energy in a direction of the front end.

8. The acoustic pulse source apparatus of claim 1, further comprising an air compressor in the vented volume that provides pressurized air from the vented volume to the pressurized volume.

* * * * *